(12) United States Patent
Barber et al.

(10) Patent No.: US 8,775,371 B2
(45) Date of Patent: Jul. 8, 2014

(54) SYNCHRONIZING AN AUXILIARY DATA SYSTEM WITH A PRIMARY DATA SYSTEM

(75) Inventors: Ronald J. Barber, San Jose, CA (US); Harish Deshmukh, Mountain View, CA (US); Ning Li, Cary, NC (US); Bruce G. Lindsay, San Jose, CA (US); Sridhar Rajagopalan, Salford (GB); Roger C. Raphael, San Jose, CA (US); Eugene J. Shekita, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 693 days.

(21) Appl. No.: 12/616,679

(22) Filed: Nov. 11, 2009

(65) Prior Publication Data

US 2011/0113010 A1  May 12, 2011

(51) Int. Cl.
*G06F 17/30* (2006.01)

(52) U.S. Cl.
USPC .......................................... 707/610; 707/678

(58) Field of Classification Search
USPC ................................................ 707/610, 678
See application file for complete search history.

(56) References Cited

U.S. PATENT DOCUMENTS

| | | | | |
|---|---|---|---|---|
| 5,913,160 | A * | 6/1999 | Leung ............................ | 455/403 |
| 6,704,886 | B1 | 3/2004 | Gill et al. | |
| 7,412,460 | B2 | 8/2008 | Hrle et al. | |
| 7,644,300 | B1 * | 1/2010 | Rao ................................ | 714/5.1 |
| 2001/0010070 | A1 * | 7/2001 | Crockett et al. ............... | 711/162 |
| 2003/0204593 | A1 * | 10/2003 | Brown et al. .................. | 709/225 |
| 2004/0030852 | A1 * | 2/2004 | Coombs et al. ............... | 711/162 |
| 2005/0160242 | A1 * | 7/2005 | Griffin et al. .................. | 711/162 |
| 2005/0165867 | A1 | 7/2005 | Barton et al. | |
| 2006/0004846 | A1 | 1/2006 | Murley et al. | |
| 2006/0129618 | A1 | 6/2006 | Maier | |
| 2006/0235819 | A1 | 10/2006 | Santosuosso | |
| 2007/0043790 | A1 | 2/2007 | Kryger | |
| 2007/0180307 | A1 * | 8/2007 | Zohar et al. ........................ | 714/6 |
| 2007/0276885 | A1 | 11/2007 | Valiyaparambil et al. | |
| 2007/0288534 | A1 | 12/2007 | Zak et al. | |
| 2008/0091637 | A1 * | 4/2008 | Escamilla et al. ................ | 707/1 |
| 2008/0162840 | A1 | 7/2008 | Augenstein | |
| 2008/0244334 | A1 * | 10/2008 | Varghese ......................... | 714/48 |
| 2010/0005337 | A1 * | 1/2010 | Bensinger ......................... | 714/4 |
| 2010/0281005 | A1 * | 11/2010 | Carlin et al. .................... | 707/696 |

OTHER PUBLICATIONS

IBM Technical Disclosure entitled "System and Method for Parallel (On-The-Fly) Data Indexing in Storage Systems", IP.Com No. IPCOM000149690D, Apr. 4, 2007.

Iadh Ounis, Gianni Amati, Vassilis Plachouras, Ben He, Craig MacDonald and Christina Lioma,"Terrier: A High Performance and Scalable Information Retrieval Platform", Proceedings of ACM SIGIR '06 Workshop on Open Source Information Retrieval (OSIR 2006), Aug. 10, 2006, Seattle, Washington, USA.

* cited by examiner

*Primary Examiner* — Mahesh Dwivedi
(74) *Attorney, Agent, or Firm* — Patterson & Sheridan, LLP

(57) ABSTRACT

Techniques are disclosed for synchronizing a primary data system with an auxiliary data system that processes data for the primary data system. In one embodiment, how current the primary data system and the auxiliary data system are is determined. Requests sent from the primary data system that were not processed by the auxiliary data system are determined. The requests are resent to the auxiliary data system for processing.

20 Claims, 6 Drawing Sheets

SYNCHRONIZING AN AUXILIARY DATA SYSTEM WITH A PRIMARY DATA SYSTEM

BACKGROUND

1. Field

Embodiments of the invention relate to synchronizing data. More specifically, embodiments of the invention relate to techniques for synchronizing a primary data system with an auxiliary data system.

2. Description of the Related Art

Auxiliary data systems process data for a primary data system. An example of a primary data system is a content management system. An example of an auxiliary data system is a text indexing system for the content management system. A content management system (CMS) generally refers to a software application for managing work flow to collaboratively create, edit, and/or review various kinds of digital media and electronic text. Similarly, a text indexing system generally refers to a software application that creates and maintains a search index for the CMS.

Synchronizing the auxiliary data system with the primary data system upon restoring (or restarting) the primary data system presents challenges. To keep the primary data system and the auxiliary data system synchronized, the primary data system and the auxiliary data system may be backed up synchronously. For example, the primary data system and the auxiliary data system may both be shut down so that no changes can be made to either system. The primary data system and the auxiliary data system may be backed up. However, shutting down the primary data system and the auxiliary data system for a synchronous backup may be impractical and/or unacceptable in high-availability systems, especially, if the primary data system and/or the auxiliary data system is scaled across many nodes.

Alternatively, the auxiliary data system may discard and rebuild auxiliary data (e.g., a text index) to synchronize the primary data system and the auxiliary data system upon restoring (or restarting) the primary data system. However, rebuilding the auxiliary data may be time consuming and inefficient, as many elements of the index may be unchanged, but nevertheless rebuilt from scratch. Further, features (e.g., searching the CMS) provided by the auxiliary data system may be unavailable while the auxiliary data is being rebuilt. It may be unacceptable for the features to be unavailable for an extended period of time while rebuilding the auxiliary data system.

SUMMARY

One embodiment of the invention includes a computer-implemented method. The method may generally include configuring one or more computer processors to perform an operation for synchronizing a primary data system with an auxiliary data system that processes data for the primary data system. The operation may generally include determining how current the primary data system is in terms of requests sent from the primary data system to the auxiliary data system; determining how current the auxiliary data system is in terms of data processed for the primary data system in response to the requests; identifying, from how current the primary and auxiliary data systems are determined to be, one or more requests sent from the primary data system that have not been processed by the auxiliary data system; and resending the determined one or more requests to the auxiliary data system for processing.

Another embodiment of the invention includes a computer-readable storage medium containing a program, which, when executed on a processor, performs an operation for synchronizing a primary data system with an auxiliary data system that processes data for the primary data system. The operation may generally include determining how current the primary data system is in terms of requests sent from the primary data system to the auxiliary data system; determining how current the auxiliary data system is in terms of data processed for the primary data system in response to the requests; identifying, from how current the primary and auxiliary data systems are determined to be, one or more requests sent from the primary data system that have not been processed by the auxiliary data system; and resending the determined one or more requests to the auxiliary data system for processing.

Still another embodiment includes a system having one or more computer processors and a memory containing a program, which when executed by the one or more computer processors is configured to perform an operation for synchronizing a primary data system with an auxiliary data system that processes data for the primary data system. The operation may generally include determining how current the primary data system is in terms of requests sent from the primary data system to the auxiliary data system; determining how current the auxiliary data system is in terms of data processed for the primary data system in response to the requests; identifying, from how current the primary and auxiliary data systems are determined to be, one or more requests sent from the primary data system that have not been processed by the auxiliary data system; and resending the determined one or more requests to the auxiliary data system for processing.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
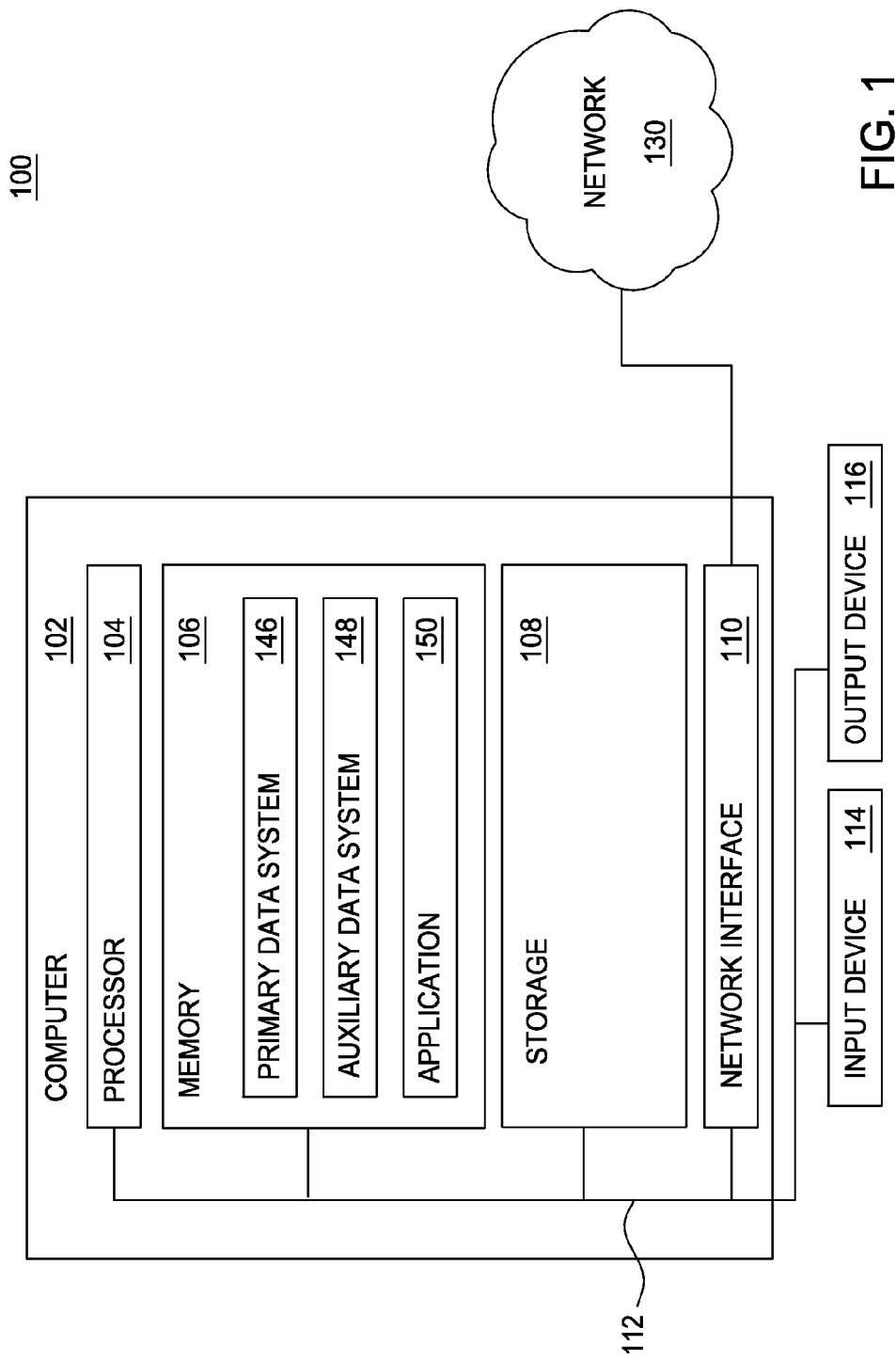
FIG. 1 is a block diagram illustrating a system for synchronizing a primary data system with an auxiliary data system, according to one embodiment of the invention.

Embodiments of the invention provide techniques for synchronizing a primary data system with an auxiliary data system that processes data for the primary data system. For example, a content management system (CMS) may be synchronized with a text indexing system for the CMS. In one embodiment, a software application may determine how current the primary data system is in terms of requests sent from the primary data system to the auxiliary data system. Further, the application may determine how current the auxiliary data system is in terms of responding to the requests. From these determinations, the application may identify requests sent from the primary data system that were not processed by the auxiliary data system. The application may resend the determined requests to the auxiliary data system for processing, synchronizing the primary data system with the auxiliary data system upon restarting or restoring the primary data system. Further, the application does not require that the backups of the primary data system and of the auxiliary data system be synchronous. For example, the application may synchronize the primary data system with the auxiliary data system using asynchronous backups of the primary and auxiliary data systems (i.e., the primary data system and the auxiliary data system were backed up at different times). Further, if the primary data system supports being restored to any specific point in time, the application may also restore the auxiliary data system to the specific point in time.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a block diagram illustrating a system 100 for synchronizing a primary data system with an auxiliary data system, according to one embodiment of the invention. The system 100 includes a computer 102. The computer 102 may be connected to other computers via a network 130. In general, the network 130 may be a telecommunications network and/or a wide area network (WAN). In a particular embodiment, the network 130 is the Internet.

The computer 102 generally includes a processor 104 connected via a bus 112 to a memory 106, a network interface device 110, a storage 108, an input device 114, and an output device 116. The computer 102 is generally under the control of an operating system (not shown). Examples of operating systems include UNIX, versions of the Microsoft Windows® operating system, and distributions of the Linux® operating system. (Note: Linux is at trademark of Linus Torvalds in the United States and other countries.) More generally, any operating system supporting the functions disclosed herein may be used. The processor 104 is included to be representative of a single CPU, multiple CPUs, a single CPU having multiple processing cores, and the like. Similarly, the memory 106 may be a random access memory. While the memory 106 is shown as a single entity, it should be understood that the memory 106 may comprise a plurality of modules, and that the memory 106 may exist at multiple levels, from high speed registers and caches to lower speed but larger DRAM chips. The network interface device 110 may be any type of network communications device allowing the computer 102 to communicate with other computers via the network 130.

The storage 108 may be a hard disk drive storage device. Although the storage 108 is shown as a single unit, the storage 108 may be a combination of fixed and/or removable storage devices, such as fixed disc drives, floppy disc drives, tape drives, removable memory cards, or optical storage. The memory 106 and the storage 108 may be part of one virtual address space spanning multiple primary and secondary storage devices.

The input device 114 may be any device for providing input to the computer 102. For example, a keyboard, keypad, light pen, touch-screen, track-ball, or speech recognition unit, audio/video player, and the like may be used. The output device 116 may be any device for providing output to a user of the computer 102. For example, the output device 116 may be any conventional display screen or set of speakers, along with their respective interface cards, i.e., video cards and sound cards. Although shown separately from the input device 114, the output device 116 and input device 114 may be combined. For example, a display screen with an integrated touch-screen, a display with an integrated keyboard, or a speech recognition unit combined with a text speech converter may be used.

As shown, the memory 106 of the computer 102 includes a primary data system 146, an auxiliary data system 148 for the primary data system 146, and an application 150 for synchronizing the primary data system 146 and the auxiliary data system 148. As described above, the primary data system 146 may be a CMS while the auxiliary data system 148 may be a text indexing system for the CMS. Other embodiments are broadly contemplated without departing from the scope of the invention. For example, the auxiliary data system 148 may also be a multimedia indexing system (e.g., a medical imagery index) for the CMS. In another embodiment, the primary data system 146 may be a database system while the auxiliary data system 148 may be a data cube for the database system.

Further, while the application 150 is described herein as a standalone application for synchronizing the primary data system 146 with the auxiliary data system 148, other embodiments are broadly contemplated. For example, in another embodiment, the application 150 may be integrated as part of the primary data system 146 and/or the auxiliary data system 148. Further still, while the primary data system 146, the auxiliary data system 148, and the application 150 are illustrated as executing on a single computer 102, other embodiments are broadly contemplated. For example, in another embodiment, the primary data system 146, the auxiliary data system 148, and the application 150 may execute on different computers that communicate via the network 130.

In one embodiment, the primary data system 146 sends requests to the auxiliary data system 148. For example, suppose a user deletes a document from the primary data system 146. The primary data system may request that the auxiliary data system 148 modify a text index to remove any references to that document from the text index maintained by the auxiliary data system 148. Similarly, the primary data system 146 may request that the auxiliary data system 148 modify the text index to reflect a new document being added to the primary data system 146. Once the text index is modified, a search for a document may yield results that more accurately reflect a state of the primary data system 146. For example, the results may exclude a document that no longer exists in the primary data system 146 as well as include a document that has just been added to the primary data system 146.

In certain cases, the primary data system 146 can become out of sync with the auxiliary data system 148. For example, the primary data system 146 can become out of sync with the auxiliary data system 148 if the primary data system 146 and/or the auxiliary data system 148 are unavailable for a period of time (e.g., system crash, reboot, etc.). Further, the primary data system 146 can become out of sync with the auxiliary data system 148 if the primary data system 146 or the auxiliary data system 148 is restored to an earlier state (e.g., to restore data corrupted by a virus).

Figure 2:
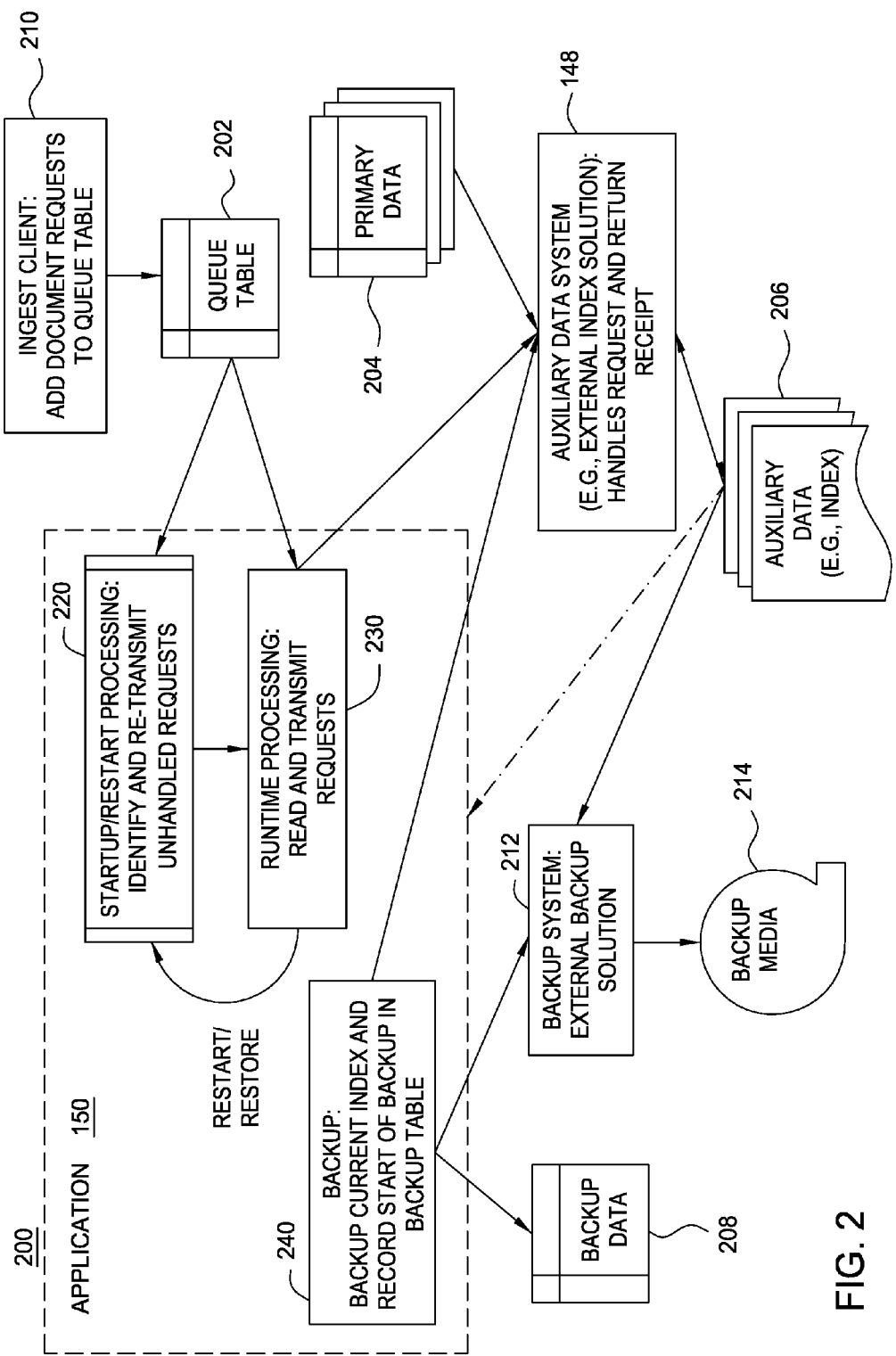
FIG. 2 is a flowchart depicting a method for synchronizing the primary data system with the auxiliary data system, according to one embodiment of the invention.

In one embodiment, the primary data system 146 may be synchronized with the auxiliary data system 148 when the primary data system 146 (and/or the auxiliary data system 148) is restarted or restored. In one embodiment, the application 150 may synchronize the primary data system 146 with the auxiliary data system 148 upon restarting (or restoring) the primary data system 146 (and/or the auxiliary data system 148), without rebuilding the auxiliary data. FIG. 2 is a flowchart depicting a method 200 for synchronizing the primary data system 146 with the auxiliary data system 148, according to one embodiment of the invention. In one embodiment, the primary data system 146 stores each request in a queue table 202 (step 210). The queue table 202 may be any database table that stores a queue of each request sent to the auxiliary data system 148 for processing. The queue table 202 may store requests processed by the auxiliary data system 148, marking such requests as "processed." During regular operation of the primary data system 146 and the auxiliary data system 148, the application 150 may read requests from the queue table 202 and transmit them to the auxiliary data system 148 for processing (step 230).

However, upon restarting (or restoring) the primary data system 146 and/or the auxiliary data system 148 (step 220), the application 150 determines whether the primary data system 146 and the auxiliary data system 148 are out of sync with one another in terms of requests sent to from the primary data system to the auxiliary data system 148. For instance, the application 150 identifies any unhandled requests in the queue table. An unhandled request is a request that the primary data system 146 regards as having sent, but that the auxiliary data system 148 does not regard as having been received (or processed). For example, an unhandled request may result from the auxiliary data system 148 having gone down for a period while the primary data system 146 continues to send requests for processing.

Further, the application 150 may perform a periodic backup of the auxiliary data 206 and of the queue table 202. In one embodiment, the application 150 may back up entries of the queue table 202 that are subsequent in time to the most current backup of the auxiliary data 206. Upon restoring the queue table 202, the application 150 may resend any (unhandled) requests from the queue table 202 to synchronize the queue table 202 with the primary data 204. Further, if the primary data system 146 is restored to a state corresponding to any specific point in time, the application 150 may also recover the queue table 202 to a state corresponding to the specific point in time. For example, the application 150 may selectively send requests from the queue table 202 up to the specific point in time. Further still, the application 150 may prune entries of the queue table 202 (e.g., that are backed up) to keep entries of the queue table within a specified time range. The application 150 may create backup data 208 of the auxiliary data 206 (step 240). The application 150 may also request an external backup system 212 send the auxiliary data to backup media 214.

In one embodiment, the application 150 receives and records receipt values from the auxiliary data system 148. As used herein, a receipt value refers to a unique identifier returned by the auxiliary data system 148 in response to receiving a request to process data for the primary data system 146 (whether directly, or mediated by the application 150). The receipt value indicates to the primary data system 146 (and/or the application 150) that the request has been received by the auxiliary data system 148 and that the auxiliary data system 148. The auxiliary data system 148 may return the receipt value prior to processing the request. The application 150 may store a new entry in the queue table upon receiving a receipt value for a request. In one embodiment, the application 150 supports synchronizing the auxiliary data system 148 to a state consistent with any receipt within a range of receipt values from the oldest receipt to the newest receipt stored in the queue table. For example, suppose the latest receipt of the auxiliary data system 148 is 24000. Further, suppose that the queue table stores receipts from 24001 to 25000. The application 150 supports synchronizing the auxiliary data system 148 to a state consistent with any receipt between 24001 to 25000. If the primary data system 146 supports point-in-time recovery, both the primary data system 146 and the auxiliary data system 148 may be restored to a specific point in time corresponding to a receipt between 24001 to 25000, according to one embodiment.

However, if the latest receipt of the auxiliary data system 148 is 24500, the application 150 may merely support synchronizing the auxiliary data system 148 to any receipt between 24501 to 25000, according to one embodiment (even though the queue table stores earlier receipts). To synchronize the auxiliary data system 148 to a state consistent with an earlier receipt, a user may restore the auxiliary data system 148 from an older backup. For example, if the user restores the auxiliary data system 148 to a receipt 24199, the application 150 may support synchronizing the auxiliary data system 148 to any receipt between 24200 to 25000.

There may also be cases where the application 150 is unable to synchronize the auxiliary data system 148. For example, if the auxiliary data system 148 is restored to a state consistent with a receipt value of 23000 or 26000, the application 150 may notify a user to restore the auxiliary data system 148 from another backup. The user may restore the auxiliary data system 148 to a state that is compatible with the range of receipts stored in the queue table (or in other words, to a range supported by the queue table). Suppose the queue table stores receipts from consecutively numbered from $r_{min}$ to $r_{max}$. In one embodiment, the application 150 may synchronize the auxiliary data system 148 using receipts stored in the queue table as long as the auxiliary data system 148 has a state consistent with any receipt value within a range given by $r_{min}-1$ to $r_{max}-1$.

In one embodiment, the application 150 may use "hardened receipt values" to prevent false positives in identifying that the auxiliary data system 148 is ahead of the primary data system 146 (and thus initiating a backup recovery). The application 150 may periodically send a latest "hardened receipt value" to the auxiliary data system 148. As used herein, the latest hardened receipt value indicates to the auxiliary data system 148 the latest receipt value that the auxiliary data system 148 should persist (e.g., store into the storage 108). In other words, the auxiliary data system 148 may receive new requests and return new receipt values as long as the auxiliary data system 148 does not persist any receipt value greater than the hardened receipt value—that is, until the auxiliary data system 148 receives a greater "hardened receipt value" from the application 150 (assuming receipt values are distinct and increase in value).

Figure 3:
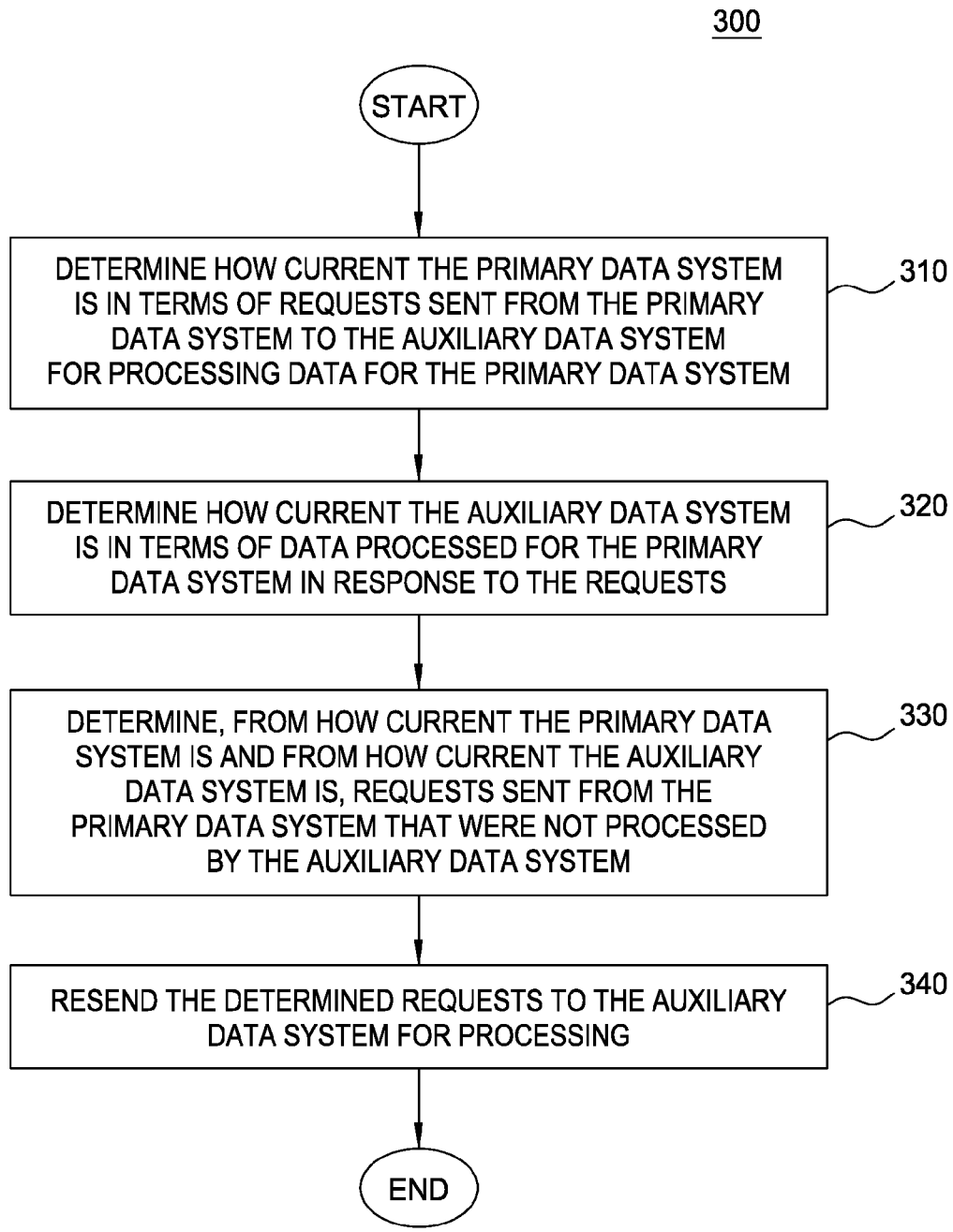
FIG. 3 is a flowchart depicting a method for synchronizing the primary data system with the auxiliary data system, according to one embodiment of the invention.

FIG. 3 is a flowchart depicting a method 300 for synchronizing the auxiliary data system 148 with the primary data system 146, according to one embodiment of the invention. The method 300 corresponds to step 220 of FIG. 2. As shown, the method 300 begins at step 310, where the application 150 determines how current the primary data system 146 is terms of requests sent from the primary data system 146 to the auxiliary data system. For example, in one embodiment, both the primary data system 146 and the queue table 202 are restored from a synchronous backup (i.e., a backup of both the primary data system 146 and the queue table 202 that is created at a specific point in time). The application 150 may identify a most recent receipt value stored in the queue table 202. The identified receipt value indicates a state of the primary data system 146 relative to the auxiliary data system 148. The identified receipt value may also represent an extent to which the auxiliary data system 148 is not synchronized with the primary data system 146.

At step 320, the application 150 determines how current the auxiliary data system 148 is in terms of data processed for the primary data system 146, in response to the requests. For example, the application 150 may request the auxiliary data system 148 to respond with the latest receipt value stored in the auxiliary data system 148. At step 330, the application 150 identifies any requests sent from the primary data system 146 that were not processed by the auxiliary data system 148, based on how current the primary data system 146 and the auxiliary data system 148 are relative to one another. For example, suppose that the receipt values are distinct, ascending integers. If the latest receipt value stored in the queue table is 24650 and the latest receipt value stored in the auxiliary data system 148 is 24600, the application 150 would determine that the requests associated with the receipt values 24601 through 24650 need to be re-sent to the auxiliary data system 148 to synchronize the auxiliary data system 148 with the primary data system 146.

At step 340, the application 150 resends the determined requests to the auxiliary data system 148 for processing. For example, the application 150 resends, from the queue table 202, the requests associated with receipt values 24601 through 24650 to the auxiliary data system 148 for processing. After the step 340, the method 300 terminates.

Figure 4:
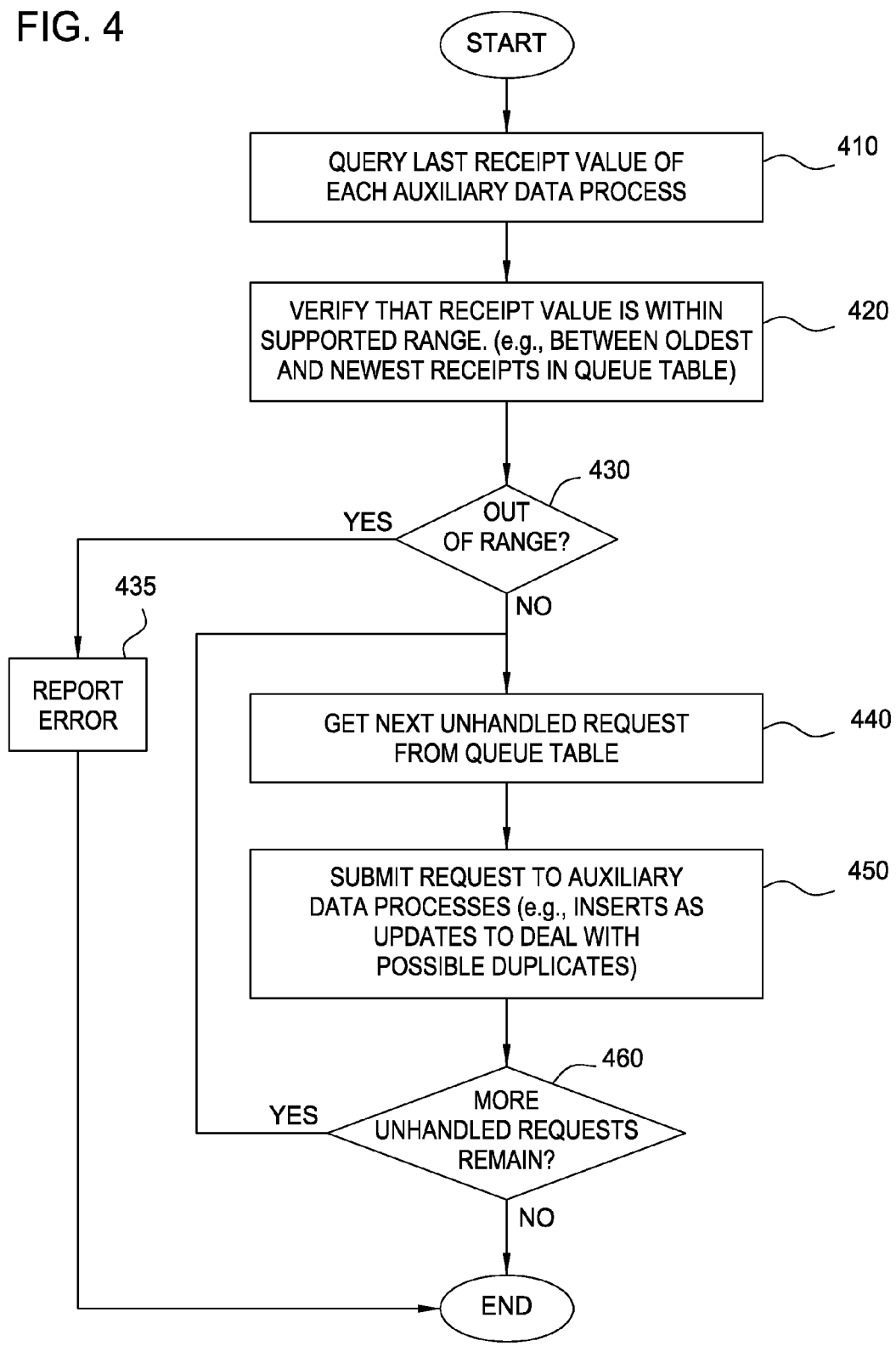
FIG. 4 is a flowchart depicting a method for synchronizing the primary data system with the auxiliary data system, according to one embodiment of the invention.

FIG. 4 is a flowchart depicting a method 400 for synchronizing the primary data system 146 with the auxiliary data system 148, according to one embodiment of the invention. Method 400 further illustrates steps 320 through 340 of FIG. 3. That is, method 400 further illustrates how to synchronize the auxiliary data system 148 with the primary data system 146 based on how current the auxiliary data system 148 is (i.e., relative to the primary data system 146). In one embodiment, the auxiliary data system 148 may include multiple auxiliary data processes. As shown, the method 400 begins at step 410, where the application 150 determines the latest receipt value of each auxiliary data process. At step 420, the application 150 verifies that the latest receipt values are within a supported range of receipt values.

For example, if the latest receipt values are not within the supported range of receipt values, the application 150 may notify a user to restore the auxiliary data system 148 from a different backup. Suppose that the receipt values stored in the queue table range from 25000 to 26000. If the latest receipt value of the auxiliary data system 148 is 24950, the application 150 may notify the user to restore the auxiliary data system 148 from a more recent backup. Further, if the latest receipt value of the auxiliary data system is 26050, the application 150 may notify the user to restore the auxiliary data system 148 from an older backup. At step 430, the application 150 determines whether any receipt value of an auxiliary data process is outside of the supported range of receipt values. If so, the application 150 reports an error (step 435) and the method 400 terminates. For example, the application 150 may report an error if the auxiliary data reflects a point in time that is more recent than the primary data. Further, the application 150 may report an error if the auxiliary data reflects a point in time that is prior to the oldest receipt stored in the queue table (e.g., due to backups of the auxiliary data being purged).

If the receipt values are within the supported range of receipt values (step 430), the application 150 may also determine whether receipt values are out of sync between the primary data system 146 and the auxiliary data system 148. In one embodiment, the receipt values stored in the queue table reflect the state of the primary data system 146. Suppose that the receipt values are out of sync between the primary data system 146 and the auxiliary data system 148. The application 150 may then retrieve a request to resend from the queue table (step 440). The application 150 may submit the retrieved request to the auxiliary data processes. For example, in one embodiment, the application 150 may submit, to the auxiliary data system 148, a request to insert data as a request to update the data (e.g., to prevent duplicates from being created in the auxiliary data system 148).

At step 460, the application 150 determines whether more requests remain to be re-sent to the auxiliary data system 148. If so, the method 400 returns to the step 440 to resend a next request to the auxiliary data system 148.

Figure 5:
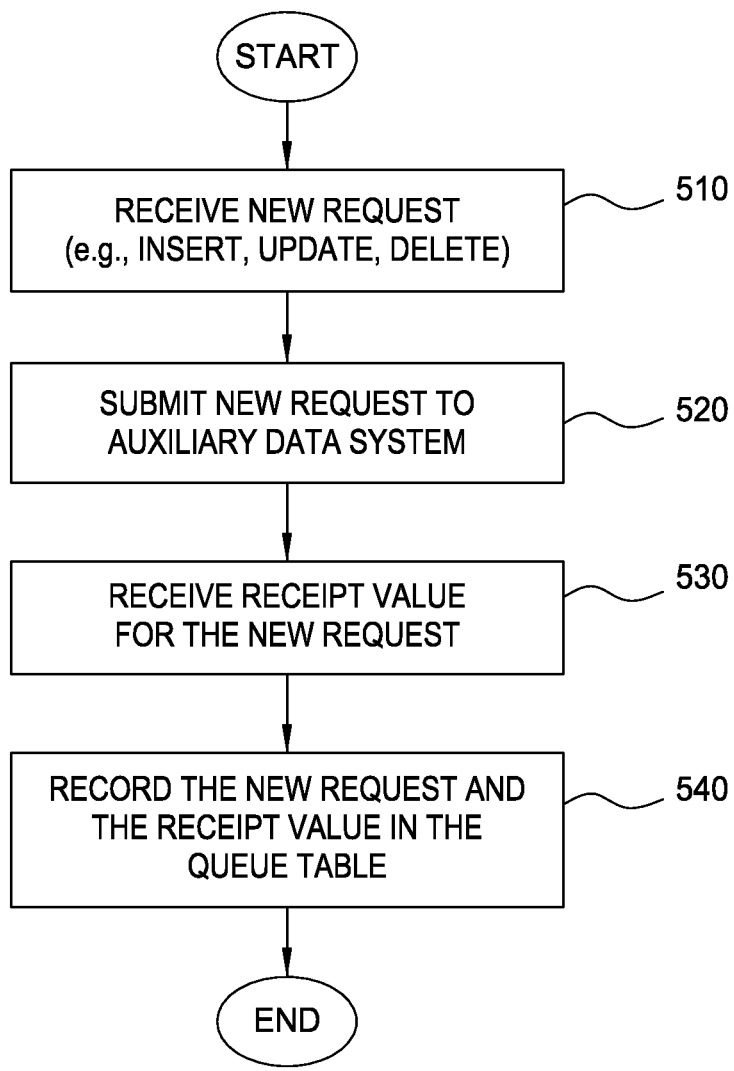
FIG. 5 is a flowchart depicting a method for storing receipt values in a queue table, according to one embodiment of the invention.

FIG. 5 is a flowchart depicting a method 500 for storing receipt values in the queue table 202 of FIG. 2, according to one embodiment of the invention. As shown, the method 500 begins at step 510, where the application 150 receives a new request from the primary data system 146. The new request may be to insert, update, or delete data in the auxiliary data system 148. At step 520, the application 150 submits the new request to the auxiliary data system 148 for processing. At step 530, the application 150 receives, from the auxiliary data system 148, a receipt value for the new request. The receipt value indicates to the application 150 that the auxiliary data system 148 has received the new request for processing. At step 540, the application 150 records the new request and the receipt value in the queue table 202. Of course, those skilled in the art will recognize that the way of maintaining the queue table 202 may be tailored to suit the needs of a particular case. For example, in one embodiment, the application 150 may store a new request received from the primary data system 146 and subsequently tag the stored request with a receipt value received for the new request. In another embodiment, the primary data system 146 may maintain the queue table 202 directly. In any case, new requests are stored and tagged with receipt values in the queue table 202.

Figure 6:
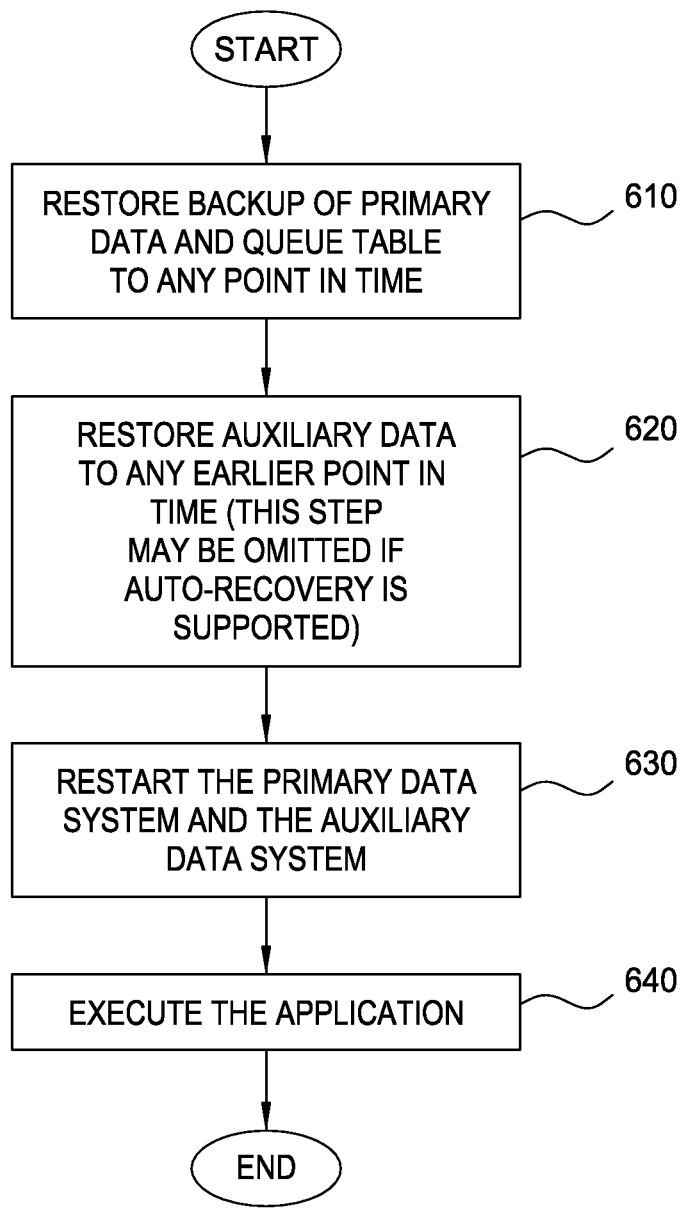
FIG. 6 is a flowchart depicting a method for synchronizing the primary data system with the auxiliary data system, according to one embodiment of the invention.

FIG. 6 is a flowchart depicting a method 600 for synchronizing the primary data system 146 with the auxiliary data system 148, according to one embodiment of the invention. As shown, the method 600 begins at step 610, where the primary data and the queue table are restored (from a backup) to a particular point in time. At step 620, the auxiliary data may be restored to any point in time at or subsequent to the specific point in time to which the primary data and the queue table were restored. At step 630, the primary data system 146 and the auxiliary data system 148 may be restarted. At step 640, the application 150 synchronizes the primary data system 146 with the auxiliary data system 148. Alternatively, the application 150 may notify a user that the primary data system 146 and the auxiliary data system 148 are not synchronized (and provide relevant receipt values, etc.).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Advantageously, embodiments of the invention provide techniques for synchronizing a primary data system with an auxiliary data system that processes data for the primary data system. One embodiment of the invention provides an application for synchronizing the primary data system with the auxiliary data system. In one embodiment, the application may determine how current the primary data system is in terms of requests sent to the auxiliary data system for processing data for the primary data system. Further, the application may determine how current the auxiliary data system is in terms of data processed for the primary data system in response to the requests. Further still, the application may determine requests sent from the primary data system that were not processed by the auxiliary data system. Still further, the application may resend the determined requests to the auxiliary data system for processing. Accordingly, the primary data system may be synchronized with the auxiliary data system upon restarting or restoring the primary data system and subsequent to asynchronously backing up the primary data system and the auxiliary data system. That is, the primary data system and the auxiliary data system need not be backed up synchronously. Further, the auxiliary data system need not be rebuilt entirely. Further still, if the primary data system supports being restored to any specific point in time, the application may also restore the auxiliary data system to the specific point in time.

While the foregoing is directed to embodiments of the present invention, other and further embodiments of the invention may be devised without departing from the basic scope thereof, and the scope thereof is determined by the claims that follow.

What is claimed is:

1. A computer-implemented method to synchronize data systems based on one or more desynchronization types, the method comprising:
performing a first type of synchronizing operation responsive to a determination that a first type of desynchronization has occurred, the first type of desynchronization comprising a primary data system being less current than an auxiliary data system in terms of operating on one or more data objects and as determined based at least in part on a latest receipt value of the auxiliary data system being outside of a supported range of receipt values, wherein the primary data system is configured to perform a first predefined operation on the one or more data objects, the first type of synchronizing operation comprising:
causing a user restoration of the auxiliary data system from a backup of the auxiliary data system to an earlier point in time than reflected by the primary data system, wherein the user restoration results in the auxiliary system being within the supported range of receipt values; and
by operation of one or more computer processors, causing a second predefined operation to be performed by the restored auxiliary data system on one or more identified data objects in order to resynchronize the restored auxiliary data system with the primary data system, wherein the one or more identified data objects is a subset of the one or more data objects and has a smaller count of data objects than the one or more data objects.

2. The computer-implemented method of claim 1, wherein the primary data system comprises a content management system (CMS), and wherein the auxiliary data system comprises a text indexing system for searching the CMS.

3. The computer-implemented method of claim 1, further comprising:
causing the primary data system and the auxiliary data system to be backed up asynchronously.

4. The computer-implemented method of claim 1, wherein an indication of whether the operation is successfully performed is recorded.

5. The computer-implemented method of claim 1, wherein the second predefined operation is different from the first predefined operation, wherein the primary data system is less current than the auxiliary data system, due to at least one of: (i) a restart of the primary data system and (ii) a restoration of the primary data system from a backup of the primary data system to an earlier point in time than reflected by the auxiliary data system, and wherein the method further comprises:
performing a second type of synchronizing operation different from the first type of synchronizing operation, upon determining that a second type of desynchronization has occurred, wherein the second type of desynchronization is different from the first type of desynchronization and comprises the auxiliary data system being less current than the primary data system in terms of operating on the data objects and as determined based at least in part on the latest receipt value of the auxiliary data system being within the supported range of receipt values, due to at least one of a restart of the auxiliary data system and a restoration of the auxiliary data system to an earlier point in time than reflected by the primary data system.

6. The computer-implemented method of claim 5, wherein performing the second type of synchronizing operation comprises:
causing the auxiliary data system to perform the second predefined operation on at least one identified data object, in order to resynchronize the auxiliary data system with the primary data system, without causing any restoration of the auxiliary data system from a backup of the auxiliary data system to an earlier point in time than reflected by the primary data system.

7. The computer-implemented method of claim 6, wherein the auxiliary data system is configured to receive one or more request to perform the second predefined operation, wherein the method comprises:
storing, in a queue table, each request to the auxiliary data system to perform the second predefined operation; and
storing, in the queue table, an indication of whether each respective request to the auxiliary data system to perform the second predefined operation is successfully processed by the auxiliary data system;
wherein at least one object selected from: (i) the one or more data objects and (ii) the at least one data object is identified based on the queue table.

8. The computer-implemented method of claim 7, wherein the primary data system comprises a content management system (CMS), wherein the auxiliary data system comprises a text indexing system for searching the CMS, wherein the first predefined operation is selected from at least an operation for inserting a data object, an operation for updating a data object, and an operation for deleting a data object, wherein the second predefined operation comprises indexing a data object for which the first predefined operation is successfully performed by the primary data system, and wherein the method further comprises:
subsequent to the primary data system and the auxiliary data system being synchronized, upon receiving, from the primary data system, an indication that the primary data system has successfully performed a first predefined operation on each data object, causing the auxiliary data system to perform a second predefined operation on the respective data object.

9. The computer-implemented method of claim 8, further comprising:
storing, in the queue table, an indication of whether each respective request to the auxiliary data system to perform the second predefined operation has been sent by the primary data system;
accessing the queue table to identify a plurality of unhandled requests.

10. The computer-implemented method of claim 9, wherein the plurality of unhandled requests include:
(i) a first unhandled request representing a first data object sent by the primary data system and not received by the auxiliary data system;
(ii) a second unhandled request representing a second data object sent by the primary data system and received by the auxiliary data system but not processed by the auxiliary data system;

(iii) a third unhandled request representing a third data object received and processed by the auxiliary data system but not indicated as having been sent by the primary data system; and (iv) a fourth unhandled request representing a fourth data object received but not processed by the auxiliary data system and not indicated as having been sent by the primary data system.

11. The computer-implemented method of claim 10, wherein each unhandled request is distinct and is of a distinct request type, wherein each data object is distinct, and wherein the method further comprises:

determining, based on each distinct request type, corresponding types of desynchronization and synchronizing operation, respectively.

12. The computer-implemented method of claim 11, wherein the primary data system and the auxiliary data system are backed up asynchronously, wherein a first backup of the primary data system is generated, the first backup reflecting a first point in time of the primary data system, wherein a second backup of the auxiliary data system is generated, the second backup reflecting a second point in time of the auxiliary data system, wherein the first point in time is different from the second point in time, wherein the method further comprises:

causing a restoration of the primary and auxiliary data systems from the first and second backups, respectively;

determining a desynchronization type of the restored primary and auxiliary data systems, wherein the desynchronization type is selected from the first and second types of desynchronization; and performing a synchronizing operation based on the determined desynchronization type, wherein the synchronizing operation is selected from the first and second types of synchronizing operations;

whereby the primary and auxiliary data systems are restored and resynchronized without requiring synchronous backups of the primary and auxiliary data systems, wherein the synchronous backups comprise backups of the primary and auxiliary data systems from a same point in time.

13. A non-transitory computer-readable medium containing a program which, when executed, performs an operation to synchronize data systems based on one or more desynchronization types, the operation comprising:

performing a first type of synchronizing operation responsive to a determination that a first type of desynchronization has occurred, the first type of desynchronization comprising a primary data system being less current than an auxiliary data system in terms of operating on one or more data objects and as determined based at least in part on a latest receipt value of the auxiliary data system being outside of a supported range of receipt values, wherein the primary data system is configured to perform a first predefined operation on the one or more data objects, the first type of synchronizing operation comprising:

causing a user restoration of the auxiliary data system from a backup of the auxiliary data system to an earlier point in time than reflected by the primary data system, wherein the user restoration results in the auxiliary system being within the supported range of receipt values; and by operation of one or more computer processors when executing the program, causing a second predefined operation to be performed by the restored auxiliary data system on one or more identified data objects in order to resynchronize the restored auxiliary data system with the primary data system, wherein the one or more identified data objects is a subset of the one or more data objects and has a smaller count of data objects than the one or more data objects.

14. The non-transitory computer-readable medium of claim 13, wherein the primary data system comprises a content management system (CMS), and wherein the auxiliary data system comprises a text indexing system for searching the CMS.

15. The non-transitory computer-readable medium of claim 13, wherein the operation further comprises:

causing the primary data system and the auxiliary data system to be backed up asynchronously.

16. The non-transitory computer-readable medium of claim 13, wherein an indication of whether the operation is successfully performed is recorded.

17. A system, comprising:

one or more computer processors; and a memory containing a program, which when executed by the one or more computer processors is configured to perform an operation to synchronize data systems based on one or more desynchronization types, the operation comprising:

performing a first type of synchronizing operation responsive to a determination that a first type of desynchronization has occurred, the first type of desynchronization comprising a primary data system being less current than an auxiliary data system in terms of operating on one or more data objects and as determined based at least in part on a latest receipt value of the auxiliary data system being outside of a supported range of receipt values, wherein the primary data system is configured to perform a first predefined operation on the one or more data objects, the first type of synchronizing operation comprising:

causing a user restoration of the auxiliary data system from a backup of the auxiliary data system to an earlier point in time than reflected by the primary data system, wherein the user restoration results in the auxiliary system being within the supported range of receipt values; and causing a second predefined operation to be performed by the restored auxiliary data system on one or more identified data objects in order to resynchronize the restored auxiliary data system with the primary data system, wherein the one or more identified data objects is a subset of the one or more data objects and has a smaller count of data objects than the one or more data objects.

18. The system of claim 17, wherein the primary data system comprises a content management system (CMS), and wherein the auxiliary data system comprises a text indexing system for searching the CMS.

19. The system of claim 17, wherein the operation further comprises:

causing the primary data system and the auxiliary data system to be backed up asynchronously.

20. The system of claim 17, wherein an indication of whether the operation is successfully performed is recorded.

* * * * *